United States Patent Office 3,347,773
Patented Oct. 17, 1967

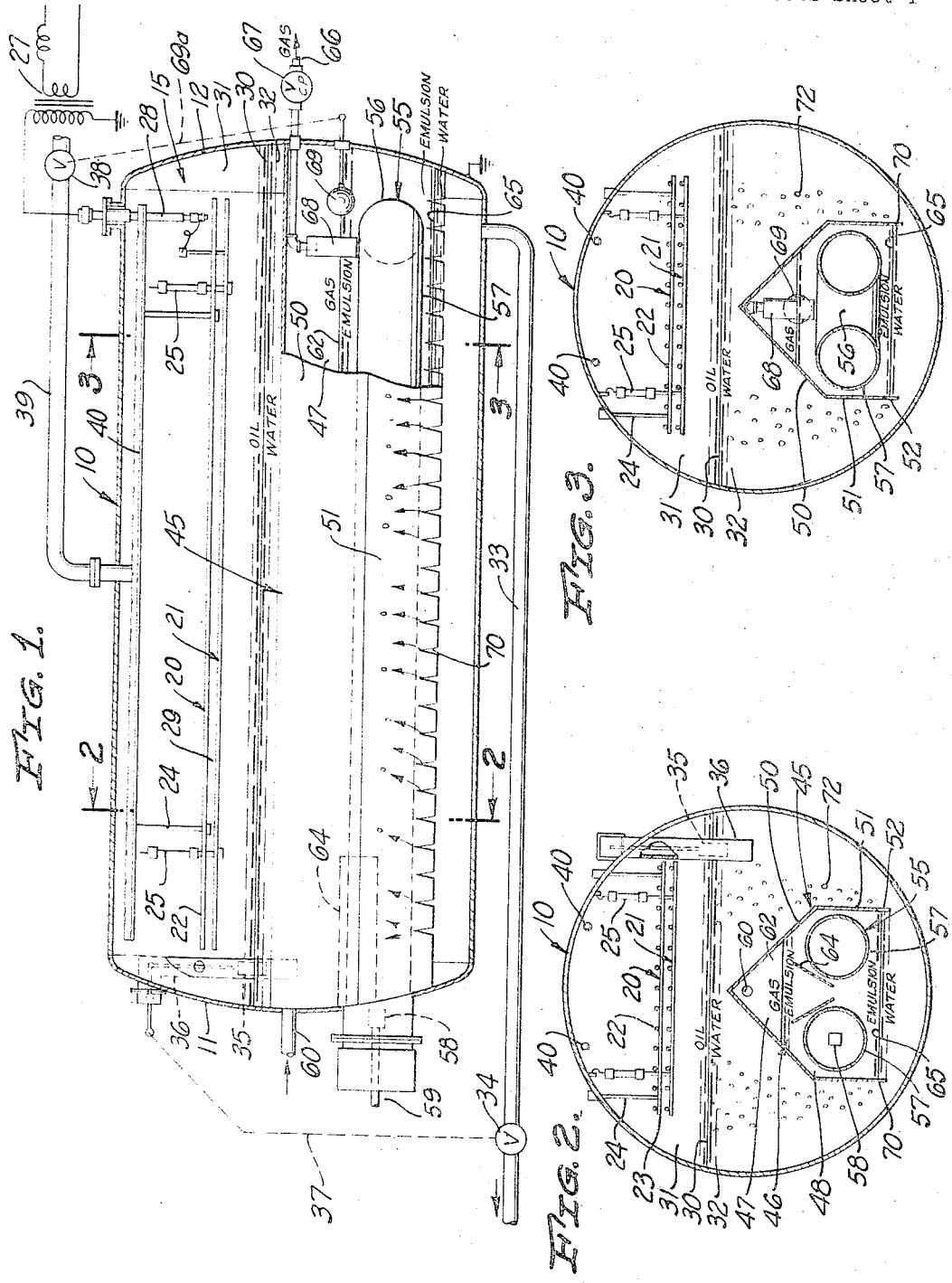

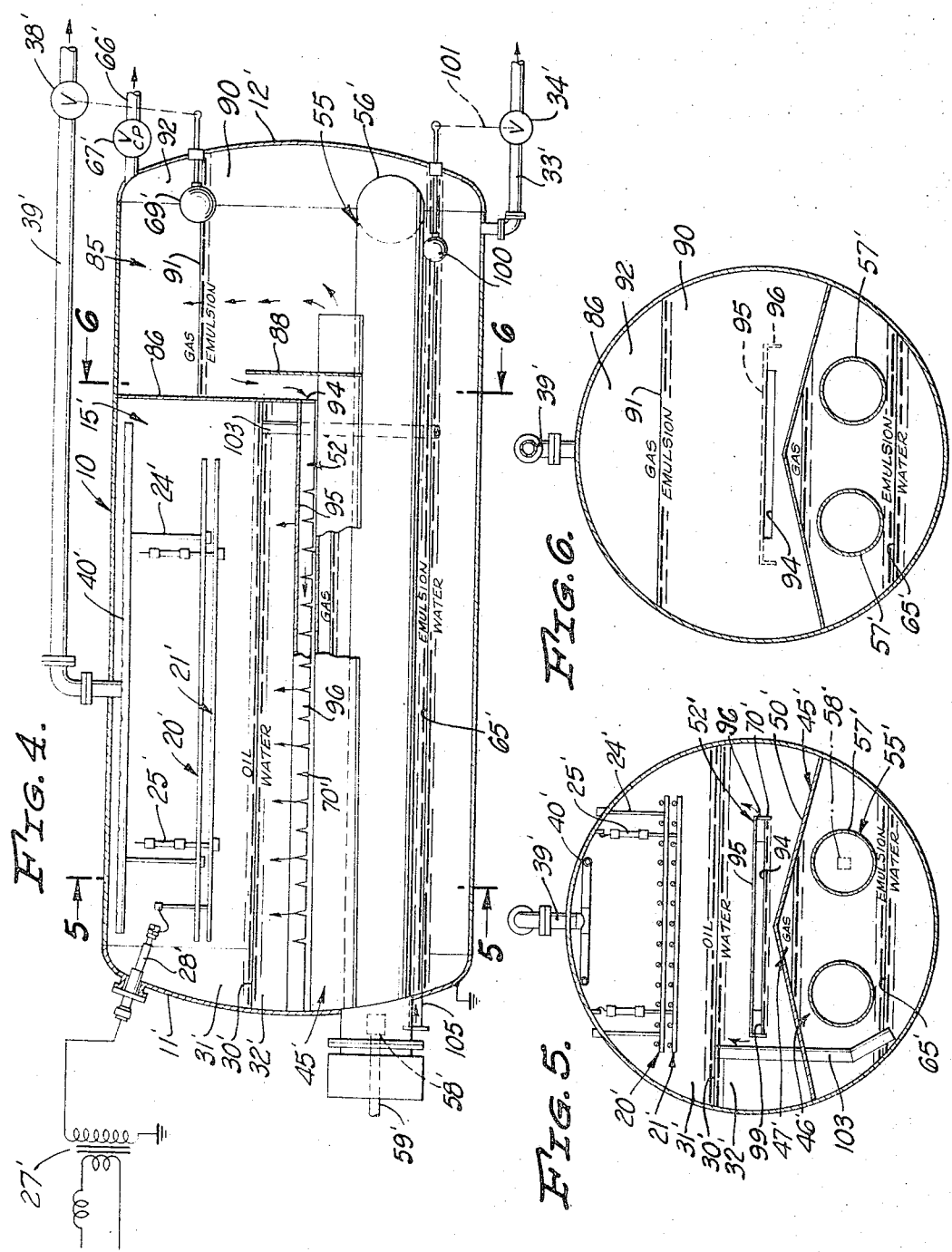

3,347,773
GAS-WATER SEPARATOR FOR EMULSIONS
Delber W. Turner, Houston, Tex., assignor, by mesne assignments, to National Tank Company, a corporation of Nevada
Filed Apr. 20, 1964, Ser. No. 361,118
19 Claims. (Cl. 204—302)

My invention relates to the separation of gas and/or water from oil-continuous emulsions containing same. More particularly it relates to a process and apparatus for removing gas and/or free water from such emulsions prior to subjecting them to an emulsion-resolving electric field.

In the electric treatment of gas-containing emulsions it is desirable to separate gas and free water therefrom before subjecting the emulsion to the action of a high-voltage electric field, this field acting to coalesce the dispersed water phase into masses of sufficient size to gravitate from the oil in the main treating chamber in which the electric field is established. It has been proposed to effect separation of gas and free water in small zones of a horizontal container, each zone being spaced from the main treating chamber. Such gas-separation or free-water-separation zones have necessarily been of limited horizontal length and have not been fully effective in performing their desired functions. Also it has been the practice in prior treaters to separate gas in an upper section of the container.

It is an object of the invention to provide a treating structure that greatly increases the effectiveness of gas and/or free water separation in an electric dehydrator or gas-water separator housed in a substantially horizontal container. In this connection it is an object to provide long zones for such gas and/or free water separation thus greatly increasing the effectiveness of the separation by providing zones or areas of large horizontal dimension in which the emulsion remains for prolonged times before electric treatment.

Another object of the invention is to provide a gas-separation zone in a horizontally-elongated container at a level below the main treating chamber; also to provide for separation of free water from the incoming emulsion throughout a long zone beneath the main treating chamber. Other objects reside in the manner of distributing the emulsion uniformly into the main treating chamber to rise therein toward or in the electric field.

Other objects reside in the baffling of a horizontally-elongated container to provide for separation of gas and/or free water below a main treating chamber that occupies a major portion of the length of the container; also in the provision of a heating means below such main treating chamber substantially throughout the length of the latter. In this latter connection it is an object to provide a U-shaped heater housing below the electric field and below a horizontally elongated baffle structure, the influent emulsion being delivered at a position below such structure. Another object is to wash the emulsion from which has has been separated before this emulsion rises to the electric field for treatment therein. Still further objects reside in the control of one or more effluents from the dehydrator or gas-water separator to maintain liquid-liquid or gas-liquid interfaces within the container at desired levels.

Further objects and advantages of the invention will be evident from the following description of exemplary embodiments.

Referring to the drawings:

FIG. 1 is a vertical sectional view of one embodiment of the invention, FIGS. 2 and 3 being lateral sectional views taken along corresponding lines thereof; and FIG. 4 is a vertical sectional view of an alternative embodiment of the invention, FIGS. 5 and 6 being transverse sectional views taken along corresponding lines thereof.

Referring particularly to FIG. 1, the gas-water separator is housed in a horzontally-elongated container 10, usually cylindrical, closed at its ends by heads 11 and 12. The upper interior of the container provides a main treating chamber 15 that should occupy a major portion of the length of the container. In the embodiment of FIG. 1 the main treating chamber extends throughout the complete length of the container between the heads 11 and 12 thereof.

Means is provided for establishing a high-voltage electric field substantially throughout the length of the main treating chamber 15. Any suitable electrode means including at least one live or energized electrode can be employed for this purpose, establishing an electric field to any element or surface at ground potential. More than one such live or energized electrode can be used and if maintained at different potentials will establish electric fields therebetween as well as fields to such grounded elements or surfaces. As shown, the electrode means includes two superimposed grid electrodes 20 and 21 each formed of rods 22 extending longitudinally of the container supported on a frame 23. The upper or grounded electrode 20 is hung from rods 24 electrically connecting it to the grounded container. This electrode is optional and can sometimes be eliminated. The lower or energized electrode 21 is hung from insulators 25 and rods that extend through suitable openings in the upper electrode 20. Energization of the electrode 21 is by a high-voltage A.C. or D.C. source, exemplified as a step-up transformer 27 with its high-voltage terminals respectively grounded and connected to the electrode 21 through an inlet bushing 28.

Such an electrode system establishes fields in the inter-electrode space 29, between the ends of the electrode 21 and the heads 11 and 12, and in a preliminary treating space between the electrode 21 and an oil-water interface 30 in the main treating chamber. This oil-water interface is between a body of emulsion 31 undergoing treatment and separation and a separated body of water 32 that has settled from the emulsion. The electric field or fields act to coalesce the dispersed water phase of the emulsion into masses of sufficient size to gravitate from the oil to the body of water 32. In this embodiment the lower portion of the container determines the lower boundary of the body of water 32 and water may be withdrawn therefrom through a water effluent pipe 33 having a valve 34.

Means is preferably provided for maintaining the oil-water interface 30 at a substantially constant level in the container 10. Various level-control means can be employed in this connection, FIG. 1 illustrating a float 35 in a downwardly open housing 36 traversing the container with its lower end open to the body of water 32 and its upper end open through a side orifice to the body of emulsion 31. The float 35 is connected through a linkage 37 to the water effluent valve 34.

Treated oil is withdrawn under the control of a valve 38 in an oil effluent pipe 39, this valve being controlled as later defined. This oil effluent pipe is connected to a collector pipe or pipes 40 within the upper interior of the main separating chamber 15 having openings 41 spaced from each other throughout the length of this chamber. Two manifolded collector pipes 40 are shown in FIGS. 1–3 with the manifold being connected to the treated-oil effluent pipe 39.

An important feature of the invention is the use of a baffle structure 45 extending longitudinally of the container below the electrode means throughout substantially the entire length of the main treating chamber. Below the baffle structure is a pretreating or inlet chamber 46 which provides a gas separation zone 47 and a free-water-separating and/or heater zone 48. The baffle structure 45 is preferably an inverted-trough structure with the space therein opening downwardly toward the bottom of the container 10. In the embodiment of FIGS. 1–3 the baffle structure includes sloping top walls 50 cresting near the horizontal axis of the container and depending bottom walls 51 having in their lower portions a multi-orifice emulsion-distributor means 52 to be later described. The walls 50 and 51 here extend throughout the length of the container and are welded or otherwise connected to the heads 11 and 12 thereof.

A suitable heating means is provided in the heater zone 48 and can be employed to aid in the pretreatment of the emulsion before it is subjected to the action of the electric fields. This heating means is shown as a U-shaped tubular heater housing 55 having a bight portion 56 near the head 12 and two laterally-oriented legs 57 extending longitudinally of the container to or through the head 11 or to suitable fittings connected thereto so that the legs 57 effectively terminate outside the container. Means is provided for flowing a heating medium through the heater housing 55. As exemplified in FIGS. 1–3 this includes a burner 58 in one of the legs 57 to which combustible fuel, for example a mixture of air and gas separated in the unit, is supplied through a pipe means 59. The products of combustion flow through the heater housing and from the other leg thereof into a stack, not shown. If desired the heating means may comprise a single tubular heater housing extending between the heads 11 and 12 with the stack at one end and the burner 58 at the other. Such an arrangement is advantageous on smaller-diameter treaters.

The emulsion to be treated usually contains gas and some free water in addition to the more tightly emulsified water which is to be coalesced by electric action. This emulsion is introduced below the baffle structure 45 at one or more positions therealong. In the embodiment illustrated, the influent emulsion enters the gas-separating zone 47 at one end thereof through an emulsion inlet conduit 60 (FIGS. 1 and 2) traversing the head 11 of the container. It thus flows longitudinally of the container beneath the baffle structure 45 in reaching the more remote portions of the emulsion-distributor means 52. If the inlet conduit 60 extends along the inlet chamber 46 the emulsion may discharge at one or more positions therealong but at least some portions of the emulsion will flow longitudinally of the inlet chamber before discharging through the distributor openings to be described.

Gas separates from the influent emulsion in the upper interior of the baffle structure 45 and forms a gas-emulsion interface 62 between superimposed bodies of gas and emulsion therein. In the system shown, the influent emulsion stream discharges into the body of gas at one end of the baffle structure and moves forwardly and downwardly through the gas to the interface 62. In the zone where the stream contacts the gas-emulsion interface 62 there may be disposed two baffles 64 providing therebetween a space or funnel receiving the incoming emulsion. The baffles 64 shield the emulsion from immediate contact with the heater housing 55 during the time some of the free water separates from the emulsion. The baffles 64 may be secured to the end wall 11 and may form a space converging downwardly but open forwardly in a direction toward the head 12. Such baffles are not always essential as the free water will separate without them. On the other hand they provide a means whereby some of the free water can separate without necessarily being heated, this separated water being guided downward centrally between the legs 57 of the heater housing 55.

The emulsion flows longitudinally beneath the baffle structure 45 with continued separation of gas and free water therefrom and in heat-transfer relationship with the heater housing 55. The separated free water drops to an emulsion-water interface 65, passing therethrough to the body of water therebeneath which is open to the main body of water 32. The level of the emulsion-water interface 65 depends upon the emulsion influent rate and to some extent upon the amount of gas therein and the rate of withdrawal of the separated gas. This separated gas is withdrawn through a gas effluent pipe 66 containing a pressure relief valve 67 designed to open above a set adjustable pressure to maintain the pressure in the gas zone substantially constant. The inner end of the gas effluent pipe 66 turns downwardly into a sleeve 68 open at its upper and lower ends to the bodies of gas and emulsion respectively above and below the interface 62. Separated gas enters the upper end of this sleeve 68 around the intake end of the gas effluent pipe 66 and is conducted through the valve 67.

Means is provided to maintain the gas-emulsion interface 62 at a substantially constant level. This control is exemplified as including a float 69 responsive to changes in level of the interface, this float being operatively connected to the valve 38 in the oil effluent pipe 39 by any suitable connection indicated by the dotted line 69a.

In the embodiment of the invention shown in FIGS. 1–3 the baffle structure 45 may itself provide the emulsion-distributor means 52 for discharging the emulsion at positions to rise toward the electric fields. In this connection the depending bottom walls 51 provide openings through which the emulsion above the emulsion-water interface 65 may exude. These openings are exemplified as being provided by notches 70 in the extreme lower edge of each of the depending bottom walls 51. The tops of these notches are in horizontal alignment throughout the length of the baffle structure 45 and are of any suitable shape, exemplified as tapering to a relatively sharp point and being formed by the upwardly-converging side walls of the notches 70. Those portions of the openings or notches above the emulsion-water interface 65 exude streams of the emulsion laterally into the body of water 32 to rise therein as emulsion masses 72. These emulsion masses are washed by the water in the body 32, serving further to remove some of the water from the emulsion before the latter rises to and through the oil-water interface 30 into the preliminary treating space below the electrode 21 and then into the interelectrode treating space between the electrodes to experience the aforesaid coalescing action.

It will be apparent that the upper ends of the openings or the notches 70 are in effect valved by the emulsion-water interface 65 which in raising or lowering respectively closes and opens the upper portions of the orifices. The valving of the upper portions of the openings or notches 70 is effective regardless of the rate of emulsion inflow and provides equal flows through the partially-uncovered openings irrespective of changes in inflow rate.

The arrangement of the distributor means 52 in this embodiment provides for a relatively long upward travel of the exuding emulsion through the water phase during its travel toward the electric fields. The large number of openings or notches 70 divides the emulsion into a correspondingly large number of small streams and causes a maximum surface of the emulsion to be exposed to the water while the latter is moving upwardly therethrough. These streams do not necessarily channel upwardly through the water but break up into droplets or masses to a large degree. These do not cause any substantial local disturbance when they reach the oil-water interface 30 but form above the interface a slowly rising column of the emulsion which is immediately subjected to the preliminary treating field established to this interface. The emulsion not resolved therein will rise evenly through the interelectrode space and all portions thereof will be subjected to the same time of electric treatment to produce the best possible electric treatment.

The arrangement provides for a water seal for the heater zone 48 and provides for uniform heating and exudation of the emulsion from which gases and free water have separated. The lengthwise extension of the heater housing provides excellent and prolonged heat transfer to the emulsion and more efficient use of the fuel employed. At the same time the heater is in such position that it does not interfere with the efficient use of the full cross-section of the vessel for emulsion distribution and electrical treating. The relationships are particularly important in relatively small-diameter horizontal vessels but may be used in vessels of other shape.

It is usually desirable that the top of the baffle structure 45 should slope laterally. Any solids settling thereto will thus be displaced therealong toward and downwardly along the depending bottom walls 51. Likewise the open bottom of the baffle structure 45 provides for direct separation of free water and solids, permitting withdrawal thereof through the effluent pipe 33.

The provision of a gas space in the upper interior of the baffle structure is advantageous in that the gas collecting therein insulates the heater zone 48 from the liquids above the baffle structure, insuring that substantially all of the heat will be applied to the emulsion constituents within the baffle structure and avoiding such local heating of the liquids thereabove as might induce strong thermal currents upwardly toward the electric fields. The disclosed heating also decreases loss of light fractions from the oil.

The embodiment of the invention shown in FIGS. 4–6 is quite similar to that previously described and primed numerals are applied to corresponding parts. Here the baffle structure 45′ terminates short of the head 12′ and its sloping top walls 50′ are extended laterally to the internal side walls of the container, being suitably attached thereto. A somewhat shallower gas-separation zone 47′ is formed therebeneath. Likewise the pretreating or inlet chamber 46′ is shallower and it and its component gas-separation zone 47′ open laterally on a dwell chamber 85 formed by a partition means in the upper interior of the container between this partition means and the end 12′. Dwell chamber 85 is a part of the gas-separating means and the inlet or pre-treating chamber 46′.

This partition means is shown as including a depending partition 86 separating the main treating chamber 15′ and the dwell chamber 85. This depending partition conforms to the configuration of the inner wall of the container 10′ and extends downward to the sloping top walls 50′ of the baffle structure. The partition means includes also a second partition 88 rising from the top walls 50′ and terminating within a body of emulsion 90 in the lower portion of the dwell chamber which emulsion extends from a gas-emulsion interface 91 downward to the emulsion-water interface 65′. The end of the baffle structure 45′ terminates beyond the second baffle 88 and discharges gas and emulsion into the body of emulsion 90, this emulsion having been previously treated below the baffle structure 45′ to separate free water therefrom. The gas rises through the emulsion and through the gas-emulsion interface 91 to a body of gas 92 in an upper gas zone of the dwell chamber 85. Gas is withdrawn therefrom through the gas effluent pipe 66′ under the control of its valve 67′ which, as before, is of the pressure relief type.

Emulsion from the body 90 is conducted to the emulsion-distributor means 52′ through a suitable passage means. This includes the upright space between the baffles 86 and 88 and a laterally-elongated opening 94 through the depending baffle 86 which opens directly on the upper interior of the emulsion-distributor means 52′.

The emulsion-distributor means 52′ is here a separate inverted-pan distributor having a top wall means 95 with depending bottom walls 96 having the aforesaid openings or notches 70′. The distributor is submerged in the body of water 32′ and water tends to rise therein from this body. An emulsion-water interface 99 forms therein at a level between the tops and bottoms of the openings or notches 70′, functioning similar to the emulsion-water interface 65 previously described. Thus the upper portions of the openings or notches 70′ are valved by a rise and fall of the interface 99 to exude the emulsion equally through these upper portions at positions throughout the length of the pan-type distributor. The streams divide into emulsion masses which rise through the body of water 32′ to the oil-water interface 30′ and thence into the previously described electric fields. The treated oil discharges through the oil effluent pipe 39′ and the valve 38′ therein is controlled by the float 69′ as aforesaid.

The water effluent from the bottom of the tank discharges through the water effluent pipe 33′ under the control of valve 34′ which may be operatively associated with a level-responsive means at either the oil-water interface 30′ as before or the emulsion-water interface 65′. As shown, the level-responsive means includes a float 100 responsive to changes in the emulsion-water interface 65′ connected by a linkage 101 to the valve 34′ to maintain the level of this interface substantially constant.

With this arrangement means is provided for conducting water from the body of separated water 32′ in the main treating chamber 15′ to the water in the bottom of the container 10′. This means is shown as including an overflow pipe 103 having an open upper end that will determine the level of the oil-water interface 30′. Any water tending to rise above the open upper end of this pipe will drop therethrough and be discharged into the water in the bottom of the treater below the emulsion-water interface 65′.

The heating means in the embodiment of FIGS. 4–6 can be the same as previously described. Likewise the influent emulsion can be discharged beneath the baffle structure 45′ in any of the ways previously described. However in the subject embodiment the influent emulsion is shown as being introduced through an emulsion influent pipe 105 opening below the baffle structure but within the body of emulsion above the emulsion-water interface 65′. Gas separates from the influent emulsion as the latter flows longitudinally toward the dwell chamber 85 and will usually form a small body of gas in the gas pocket at the apex of the baffle structure 45′. Rightward flow of the emulsion toward the dwell chamber 85 is facilitated by slightly inclining the baffle structure 45′ in this direction as suggested in FIG. 4.

Various changes and modifications may be made without departing from the spirit of the invention as defined in the appended claims.

I claim:

1. A gas-water separator for oil-continuous emulsions containing gases and a dispersed water phase, said separator including in combination:

a closed horizontally-elongated container providing a long main treating chamber in the upper interior thereof occupying a major portion of the length thereof;

means for establishing a high-voltage electric field substantially throughout the length of said main treating chamber, said field-establishing means including a long electrode means and means for electrically insulating same from said container;

a baffle structure extending longitudinally of said container below said electrode means throughout substantially the entire length of said main treating chamber, the space within said container below said baffle structure forming an inlet chamber, said baffle structure providing a pretreating chamber opening downwardly on the lower interior of said chamber;

conduit means for delivering a pressured stream of said emulsion directly to said inlet chamber;

conduit means opening on said inlet chamber for withdrawing separated gas therefrom;

means for withdrawing from the bottom of said container water separating in said inlet chamber and said main treating chamber; and means for delivering to said electric field emulsion from said inlet chamber from which gas and free water have separated.

2. A gas-water separator as defined in claim 1 including a horizontally-elongated heater housing in said inlet chamber below said baffle structure and means for flowing a heating medium therethrough.

3. A gas-water separator as defined in claim 2 in which said heater housing is U-shaped having a bight portion adjacent one end of said container and legs extending to the other end of said container, and in which said heating-medium flow means includes means for burning a combustible fuel within one leg of said heater housing.

4. A gas-water separator as defined in claim 1 in which said baffle structure has sloping top walls cresting longitudinally of said container and forming a gas-separation zone therebelow.

5. A gas-water separator as defined in claim 1 in which said baffle structure has top walls and spaced depending walls, said depending walls having horizontally-spaced openings therein substantially throughout the length of said main treating chamber, and including means for maintaining an emulsion-water interface within the space between said depending walls at a level between the tops and bottoms of said openings.

6. A gas-water separator as defined in claim 5 in which said depending walls provide notches extending downwardly to the lower edges of such depending walls, the tops of said notches forming said openings.

7. A gas-water separator as defined in claim 5 in which said container is adapted to contain a body of water below a body of emulsion in said main treating chamber, said body of emulsion undergoing electric treatment and separation therein, said bodies providing an oil-water interface, and including means for maintaining said oil-water interface at a substantially constant level below said electrode means and above said openings and said emulsion-water interface.

8. A gas-water separator as defined in claim 1 in which said container includes heads closing the ends thereof, and in which said baffle structure extends longitudinally throughout the interior of said container and provides ends respectively attached to said heads.

9. A gas-water separator as defined in claim 1 in which said baffle structure provides top walls extending laterally of said container to the internal side walls thereof.

10. A gas-water separator for oil-continuous emulsions containing gases and a dispersed water phase, said separator including in combination:
 a closed horizontally-elongated container providing a long main treating chamber in the upper interior thereof occupying a major portion of the length thereof, there being a partition means in the upper interior of said container bounding said main treating chamber and forming at one end of said container a dwell chamber adapted to contain bodies of gas and emulsion forming a gas-emulsion interface, said bodies of gas and emulsion being respectively in gas and emulsion zones of said dwell chamber;
 means for establishing a high-voltage electric field substantially throughout the length of said main treating chamber, said field-establishing means including a long electrode means and means for electrically insulating same from said container;
 a baffle structure extending longitudinally of said container below said electrode means throughout substantially the entire length of said main treating chamber, the space within said container below said baffle structure forming an inlet chamber, said dwell chamber opening on said inlet chamber to receive gas and emulsion therefrom;
 conduit means for delivering a pressured stream of said emulsion directly to said inlet chamber;
 means for withdrawing separated gas from said container, such gas-withdrawal means communicating with the upper interior of said dwell chamber;
 means for withdrawing from the bottom of said container water separating in said inlet chamber and said main treating chamber; and
 means for delivering to said electric field emulsion from said dwell chamber from which gas and free water have separated, said last-named means including a distributor below said electrode means and passage means delivering emulsion from said dwell chamber to said distributor, said distributor being an orificed distributor adapted to discharge the emulsion at a plurality of positions below the electrode means.

11. A gas-water separator as defined in claim 10 in which said baffle structure provides top walls extending laterally of said container to the internal side walls thereof, and in which said partition means includes a partition depending in said container from the top thereof to the top walls of said baffle structure.

12. A gas-water separator as defined in claim 11 in which said passage means includes at least one opening through said depending partition.

13. A gas-water separator as defined in claim 12 in which said passage means includes a second partition spaced from said depending partition rising from said top walls of said baffle structure, said opening interconnecting said distributor and the space between said partitions.

14. A gas-water separator as defined in claim 13 in which said top walls extend into said dwell zone to a position beyond said second partition.

15. A gas-water separator as defined in claim 10 in which said baffle structure includes downwardly-sloping top walls cresting longitudinally of said container providing a gas-separation zone in the upper interior of said baffle structure opening on said emulsion zone of said dwell chamber at a level below said gas-emulsion interface.

16. In a gas-water separator for oil-continuous emulsions containing gases and a dispersed water phase, said separator including in combination:
 a closed horizontally-elongated container providing a long main treating chamber in the upper interior thereof occupying a major portion of the length thereof;
 means for establishing a high-voltage electric field substantially throughout the length of said main treating chamber, said field-establishing means including a long electrode means and means for electrically insulating same from said container;
 a baffle structure extending longitudinally of said container below said electrode means throughout substantially the entire length of said main treating chamber, said baffle structure providing a pretreating chamber opening downwardly on the lower interior of said container;
 means for delivering a pressured stream of said emulsion to said pretreating chamber;
 conduit means opening on said inlet chamber for withdrawing separated gas therefrom;
 a multi-orifice distributor means having orifices all at the same level opening at longitudinally spaced positions below said electrode means and means for flowing emulsion from said pretreating space through said orifices; and
 water and treated-oil effluent means communicating respectively with the lower interior of said container and the upper interior of said main treating chamber.

17. A gas-water separator as defined in claim 16 in which said pretreating chamber is adapted to contain in a lower portion thereof superimposed bodies of emulsion and water forming an emulsion-water interface in said pretreating chamber, in which said main treating chamber is adapted to contain a body of water below a body of emulsion therein undergoing electric treatment and separation with such bodies forming an oil-water interface in said main treating chamber, and including means for maintaining said oil-water interface at a substantially constant level above said emulsion-water interface, and passage means interconnecting said water bodies.

18. A gas-water separator for oil-continuous emulsions containing gases and a dispersed water phase, said separator including in combination:
- a closed container of substantially greater length than width having a substantially horizontal axis and having separated oil and water effluents opening respectively on upper and lower zones of said container;
- a longitudinal inverted-trough structure within said container extending throughout a major portion of the length thereof providing therebelow a heater passage opening downwardly on the bottom of said container, there being a main treating chamber above said inverted-trough structure in the upper interior of said container extending throughout a major portion of the length thereof;
- a heater housing extending from outside said container along said heater passage longitudinally of said container below said inverted-trough structure;
- means for establishing a high-voltage electric field substantially throughout the length of said main treating chamber, said field-establishing means including a long electrode means extending substantially throughout the length of said main treating chamber and means for electrically insulating said electrode means from said container;
- distributor means below said electrode means having orifices spaced horizontally from each other substantially throughout the length of said electrode means; and
- means for flowing said emulsion into said heating passage and through said orifices to rise in said main treating chamber toward said electrode means for coalescence of said dispersed water phase and separation thereof to form an oil-water interface in said main treating chamber below said electrode means, said flow means including an emulsion supply means opening on said heater passage.

19. A gas-water separator as defined in claim 18 including means for withdrawing from the upper interior of said inverted-trough structure gas separating from the emulsion therein.

References Cited

UNITED STATES PATENTS

| | | | |
|---|---|---|---|
| 2,894,895 | 7/1959 | Turner | 204—302 |
| 3,121,055 | 2/1964 | Carswell | 204—302 |
| 3,207,686 | 9/1965 | Jarvis et al. | 204—302 |
| 3,255,571 | 6/1966 | Walker et al. | 204—308 |

JOHN H. MACK, *Primary Examiner.*

T. TUFARIELLO, *Assistant Examiner.*